United States Patent
Jung et al.

(10) Patent No.: US 10,253,673 B1
(45) Date of Patent: Apr. 9, 2019

(54) APPARATUS FOR PURIFYING EXHAUST GAS

(71) Applicants: Hyundai Motor Company, Seoul (KR); Kia Motors Corporation, Seoul (KR)

(72) Inventors: ChangHo Jung, Osan-si (KR); Pyung Soon Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/204,783

(22) Filed: Nov. 29, 2018

Related U.S. Application Data

(62) Division of application No. 15/374,768, filed on Dec. 9, 2016, now Pat. No. 10,180,097.

(30) Foreign Application Priority Data

Jul. 12, 2016 (KR) .................. 10-2016-0088157

(51) Int. Cl.

| | |
|---|---|
| *B01D 53/34* | (2006.01) |
| *F01N 9/00* | (2006.01) |
| *F01N 13/00* | (2010.01) |
| *F01N 3/022* | (2006.01) |
| *F01N 3/08* | (2006.01) |
| *B01D 53/94* | (2006.01) |
| *F01N 3/035* | (2006.01) |
| *F01N 11/00* | (2006.01) |
| *B01D 46/00* | (2006.01) |
| *F01N 3/025* | (2006.01) |
| *F01N 3/20* | (2006.01) |
| *B01J 38/00* | (2006.01) |

(52) U.S. Cl.
CPC .......... *F01N 9/002* (2013.01); *B01D 46/006* (2013.01); *B01D 46/0027* (2013.01); *B01D 53/9422* (2013.01); *B01D 53/9495* (2013.01); *F01N 3/0222* (2013.01); *F01N 3/0253* (2013.01); *F01N 3/035* (2013.01); *F01N 3/0814* (2013.01); *F01N 3/0842* (2013.01); *F01N 3/20* (2013.01); *F01N 9/00* (2013.01); *F01N 11/002* (2013.01); *F01N 11/007* (2013.01); *F01N 13/009* (2014.06); *F01N 13/0093* (2014.06); *B01D 2279/30* (2013.01); *B01J 38/00* (2013.01); *F01N 2510/06* (2013.01); *F01N 2900/1402* (2013.01); *F01N 2900/1602* (2013.01); *F01N 2900/1614* (2013.01); *Y02T 10/24* (2013.01); *Y02T 10/47* (2013.01)

(58) Field of Classification Search
CPC ............................. B01D 53/34; B01D 53/346
USPC ........................................................ 422/168
See application file for complete search history.

(56) References Cited

FOREIGN PATENT DOCUMENTS

| | | |
|---|---|---|
| JP | 2006-291825 A | 10/2006 |
| JP | 2014-131795 A | 7/2014 |
| KR | 10-2015-0122935 A | 11/2015 |

*Primary Examiner* — Edward M Johnson
(74) *Attorney, Agent, or Firm* — Morgan, Lewis & Bockius LLP

(57) ABSTRACT

A regeneration method of an apparatus of purifying an exhaust gas including a catalytic converter which is disposed on an exhaust pipe and includes a lean NOx trap (LNT) device in which a first LNT catalyst is coated and a catalyzed particulate filter (CPF) in which a second LNT catalyst is coated may include determining whether a nitrogen oxide (NOx) amount absorbed in the LNT device is greater than a threshold NOx amount, determining whether a temperature of the LNT device is higher than a first predetermined temperature when the NOx amount absorbed in the LNT device is greater than the threshold NOx amount, and regenerating, both of the LNT device and the CPF or only the LNT device according to a temperature of the CPF when the temperature of the LNT device is higher than the first predetermined temperature.

8 Claims, 7 Drawing Sheets

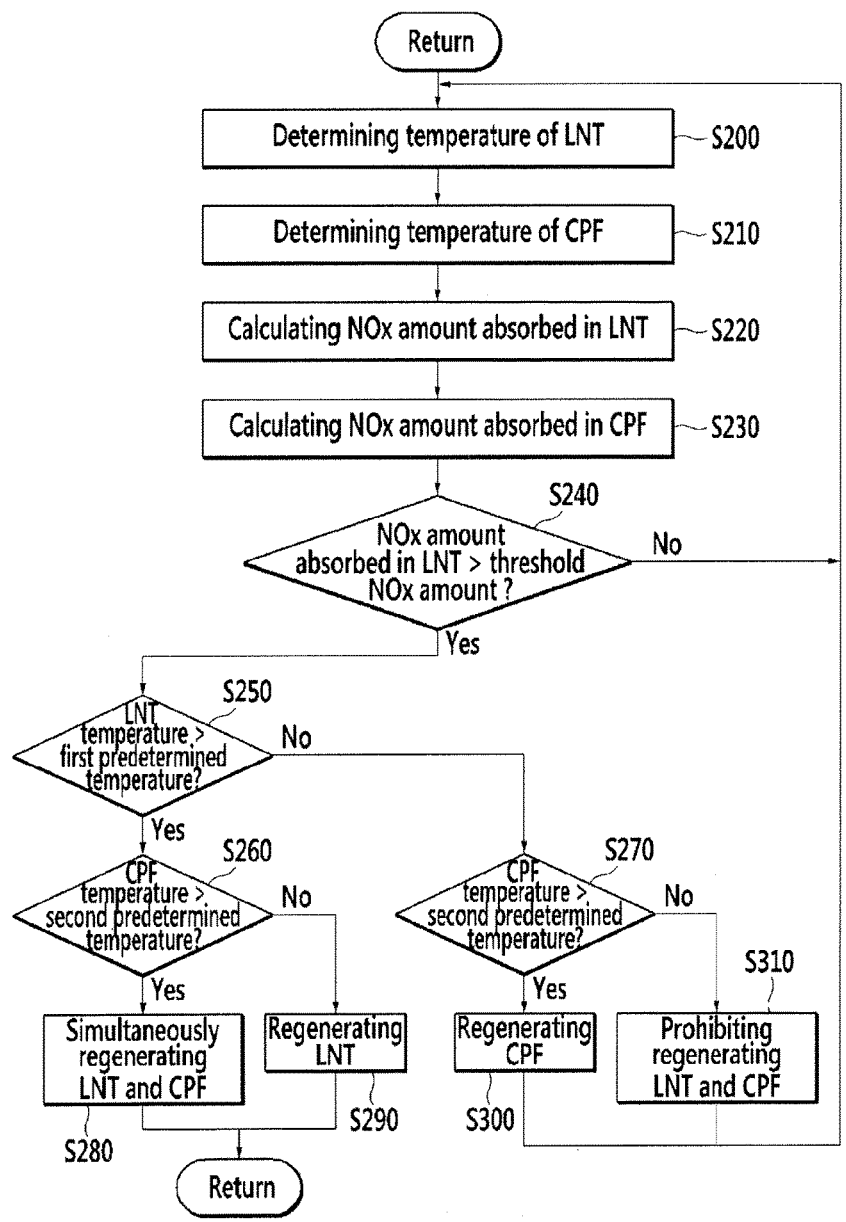

APPARATUS FOR PURIFYING EXHAUST GAS

CROSS-REFERENCE TO RELATED APPLICATION

The present application is a Divisional of U.S. patent application Ser. No. 15/374,768, filed Dec. 9, 2016, which claims priority to Korean Patent Application No. 10-2016-0088157, filed Jul. 12, 2016, the entire contents of which applications are incorporated herein for all purposes by these references.

BACKGROUND OF THE INVENTION

Field of the Invention

The present invention relates to an apparatus for purifying an exhaust gas and a regeneration method thereof. More particularly, to an apparatus for purifying an exhaust gas which includes a catalytic converter provided with a lean NOx trap (LNT) device in which a first LNT catalyst is coated and a catalyzed particulate filter (CPF) in which a second LNT catalyst is coated, and a regeneration method thereof which regenerates the LNT device and the CPF simultaneously or separately according to driving condition.

Description of Related Art

Generally, exhaust gas flowing out from an engine through an exhaust manifold is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when air/fuel ratio is lean, and releases the absorbed NOx and reduces the released nitrogen oxide and the nitrogen oxide contained in the exhaust gas when the air/fuel ratio is rich atmosphere.

If temperature of the exhaust gas, however, is high (e.g., the temperature of the exhaust gas is higher than 400° C.), the LNT catalyst cannot purify the nitrogen oxide contained in the exhaust gas. Particularly, if a vehicle runs at high speed condition or high load condition, the temperature of the exhaust gas is high and the LNT catalyst disposed closely to the engine cannot absorb the nitrogen oxide in the exhaust gas. Therefore, the nitrogen oxide in the exhaust gas may be discharged from the LNT catalyst. In addition, since flow of the exhaust gas is large at the quick acceleration condition or the high load condition, NOx exhausted to the exterior of the vehicle may be increased. Therefore, purifying performance of the nitrogen oxide may be greatly deteriorated.

Recently, a catalyst has been coated in the particulate filter to enhance a function of removing the particulate matter or additionally removing the pollutants. The particulate filter coated with a catalyst may be called a catalyzed particulate filter (CPF).

In the CPF, the catalyst is coated on the porous wall that separates the inlet channel and the outlet channel from each other, and the fluid passes through the porous wall and comes into contact with the catalyst coating. There is a pressure difference between the inlet channel and outlet channel separated by the porous wall. This allows the fluid to pass fast through the porous wall. Accordingly, the contact time between the catalyst and the fluid is short, which makes it hard for a catalytic reaction to occur efficiently.

Also, a thick catalyst coating on the porous wall allows the catalyst to block the micropores on the wall, and this may disturb the flow of the fluid from the inlet channel to the outlet channel. Accordingly, the back pressure increases. To minimize the increase in back pressure, a catalyst is thinly coated on the walls in the CPF. Thus, the amount of catalyst coating on the CPF may be insufficient for the catalytic reaction to occur efficiently.

To overcome this problem, the surface area of walls to be coated with the catalyst may be increased by increasing the number (density) of inlet channels and outlet channels (hereinafter, collectively referred to as 'cells'). However, the increase in cell density in the limited space reduces the wall thickness. The reduction in wall thickness may deteriorate the filter performance. Therefore, the cell density should not be increased to more than the density limit.

Meanwhile, more than two DeNOx catalysts are mounted on the exhaust pipe in order to secure DeNOx performance. In this case, how to control regeneration of the DeNOx catalysts is a major concern.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus of purifying an exhaust gas and a regeneration method thereof having advantages of disposing close to an engine a lean NOx trap (LNT) device in which a first lean NOx trap (LNT) catalyst is coated, disposing a catalyzed particulate filter (CPF) in which a second LNT catalyst is coated at a downstream of the LNT device, and regenerating the LNT device and the CPF simultaneously or separately according to NOx amount absorbed in the LNT device, a temperature of the LNT device, a temperature of the CPF, etc.

According to various aspects of the present invention, a regeneration method of an apparatus of purifying an exhaust gas including a catalytic converter which is disposed on an exhaust pipe and includes a lean NOx trap (LNT) device in which a first LNT catalyst is coated and a catalyzed particulate filter (CPF) in which a second LNT catalyst is coated, wherein the LNT device and the CPF are sequentially disposed in the catalytic converter may include determining, by a controller, whether a nitrogen oxide (NOx) amount absorbed in the LNT device is greater than a threshold NOx amount, determining, by the controller, whether a temperature of the LNT device is higher than a first predetermined temperature when the NOx amount absorbed in the LNT device is greater than the threshold NOx amount, and regenerating, by the controller, both of the LNT device and the CPF or only the LNT device according to a temperature of the CPF when the temperature of the LNT device is higher than the first predetermined temperature.

The regenerating both of the LNT device and the CPF or only the LNT device according to the temperature of the CPF may include determining whether the CPF temperature is higher than a second predetermined temperature, and regenerating the both of the LNT device and the CPF when the CPF temperature is higher than the second predetermined temperature.

The regenerating both of the LNT device and the CPF may be performed based on an inlet lambda of the LNT device and an outlet lambda of the CPF.

The regenerating both of the LNT device and the CPF or only the LNT device according to the temperature of the CPF may further include regenerating only the LNT device when the CPF temperature is lower than or equal to the second predetermined temperature.

The regenerating only the LNT device may be performed based on an inlet lambda of the LNT device and an outlet lambda of the LNT device.

The regeneration method may further include determining, by the controller, whether the CPF temperature is higher than a second predetermined temperature when the temperature of the LNT device is lower than or equal to the first predetermined temperature, and regenerating the CPF, by the controller, when the CPF temperature is higher than the second predetermined temperature.

The regenerating the CPF may be performed based on an outlet lambda of the LNT device and an outlet lambda of the CPF.

According to various aspects of the present invention, an apparatus for purifying an exhaust gas may include a catalytic converter disposed on an exhaust pipe and including a lean NOx trap (LNT) device in which a first LNT catalyst is coated and a catalyzed particulate filter (CPF) in which a second LNT catalyst is coated, the LNT device and the CPF being sequentially disposed in the catalytic converter, and a controller determining or detecting an inlet lambda of the LNT device, an outlet lambda of the LNT device, and an outlet lambda of the CPF, determining or detecting a temperature of the LNT device and a temperature of the CPF, determining nitrogen oxide (NOx) amounts absorbed in the LNT device and the CPF, and controlling regeneration of the LNT device and the CPF, in which the controller performs the regeneration of the LNT device and the CPF according to the temperature of the LNT device and the temperature of the CPF when the NOx amount absorbed in the LNT device is greater than a threshold NOx amount, and the controller performs regeneration of both of the LNT device and the CPF when the temperature of the LNT device is higher than a first predetermined temperature and the temperature of the CPF is higher than a second predetermined temperature.

The controller may perform the regeneration of both of the LNT device and the CPF based on the inlet lambda of the LNT device and the outlet lambda of the CPF.

The controller may perform regeneration of the LNT device when the temperature of the LNT device is higher than the first predetermined temperature and the temperature of the CPF is lower than or equal to the second predetermined temperature.

The controller may perform the regeneration of the LNT device based on the inlet lambda of the LNT device and the outlet lambda of the LNT device.

The controller may perform regeneration of the CPF when the temperature of the LNT device is lower than or equal to the first predetermined temperature and the temperature of the CPF is higher than the second predetermined temperature.

The controller may perform the regeneration of the CPF based on the outlet lambda of the LNT device and the outlet lambda of the CPF.

The CPF may include at least one inlet channel extending in a longitudinal direction, and having a first end into which fluid flows and a second end which is blocked, at least one outlet channel extending in the longitudinal direction, and having a first end which is blocked and a second end through which the fluid flows out, at least one porous wall defining a boundary between neighboring inlet and outlet channels and extending in the longitudinal direction, and a support with the second LNT catalyst coating thereon, in which the support may be disposed within at least one among the at least one inlet channel and the at least one outlet channel.

The second LNT catalyst may be coated on the porous wall.

According to various embodiments of the present invention, a lean NOx trap (LNT) device in which a first lean NOx trap (LNT) catalyst is coated is disposed close to an engine, a catalyzed particulate filter (CPF) in which a second LNT catalyst is coated is disposed at a downstream of the LNT device, and the LNT device and the CPF are regenerated simultaneously or separately according to NOx amount absorbed in the LNT device, a temperature of the LNT device, a temperature of the CPF, etc. Therefore, purifying efficiency of NOx may be improved.

In addition, slip of NOx, CO or HC from the CPF may be prevented by prohibiting regeneration of the CPF at a relatively low temperature.

In addition, loss of fuel mileage due to increase of rich duration may be prevented by prohibiting regeneration of the CPF at a relatively low temperature.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart of a regeneration method of an apparatus of purifying an exhaust gas according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
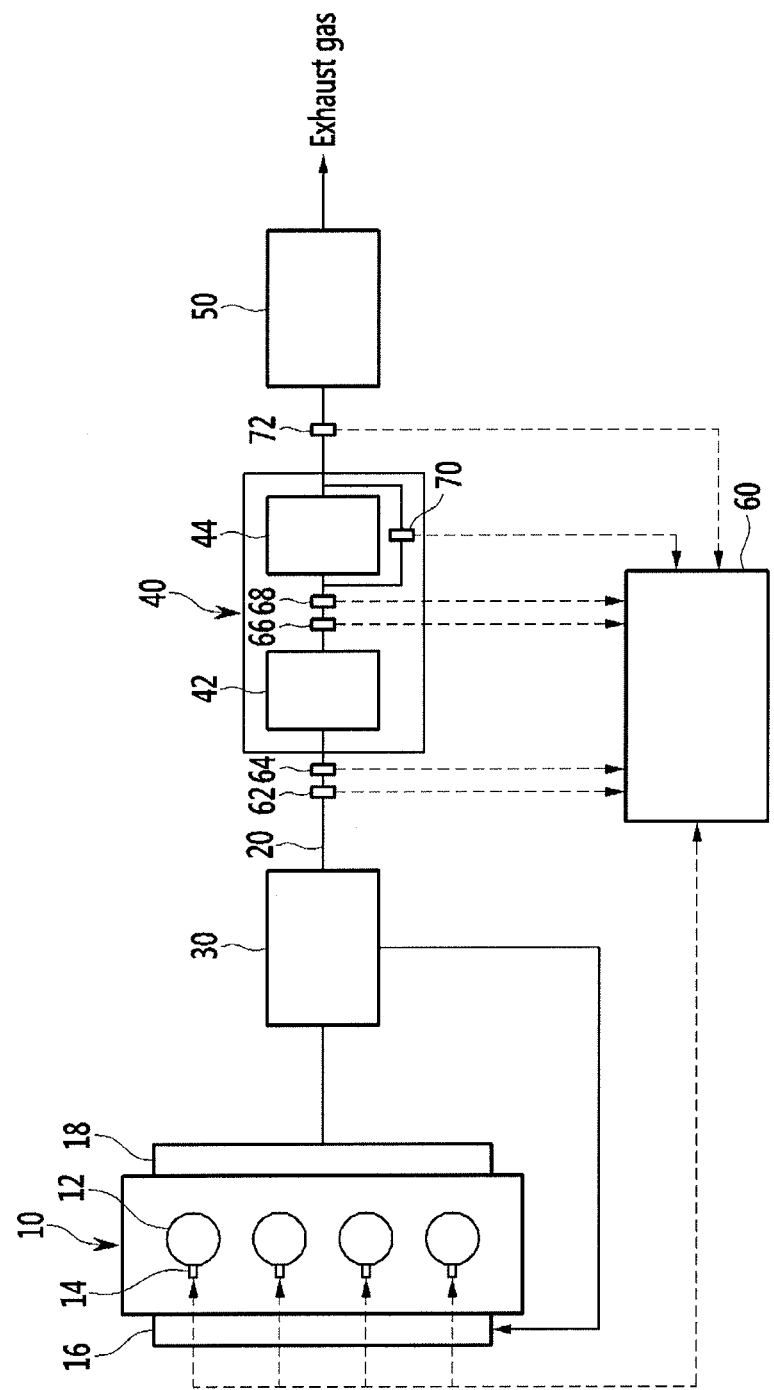
FIG. 1 is a schematic diagram of an apparatus of purifying an exhaust gas according to various embodiments of the present invention.

FIG. 1 is a schematic diagram of an apparatus of purifying an exhaust gas according to various embodiments of the present invention.

As shown in FIG. 1, an apparatus of purifying an exhaust gas according to various embodiments of the present invention includes an engine 10, an exhaust pipe 20, an exhaust gas recirculation (EGR) apparatus 30, a catalytic converter 40, a selective catalytic reduction (SCR) device 50 and a controller 60.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The catalytic converter 40 and the SCR device 50 are mounted on the exhaust pipe 20 so as to remove pollutants in the exhaust gas.

The EGR apparatus 30 is mounted on the exhaust pipe 20 and supplies a portion of the exhaust gas exhausted from the engine 10 back to the engine 10 therethrough. In addition, the EGR apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 60. Therefore, a recirculation valve controlled by the controller 60 may be mounted on a line connecting the exhaust gas recirculation apparatus 30 and the intake manifold 16.

The catalytic converter 40 is mounted on the exhaust pipe 20 downstream of the EGR apparatus 30 and includes a lean NOx trap (LNT) device 42 and a catalyzed particulate filter (CPF) 44. The LNT device 42 and the CPF 44 are sequentially disposed within the catalytic converter 40.

The LNT device 42 is coated with a first LNT catalyst therein. The LNT device 42 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT device 42 may oxidize carbon monoxide (CO) and hydrocarbon (HC) contained in the exhaust gas.

Herein, the hydrocarbon represents all compounds including carbon and hydrogen contained in the exhaust gas and the fuel.

The first LNT catalyst includes ceria ($CeO_2$), barium (Ba), and a noble metal including platinum (Pt). The ceria and the barium absorb the nitrogen oxide as nitrate, and the noble metal including the platinum oxidizes the nitrogen oxide into the nitrate and promotes oxidation-reduction reaction of the nitrogen oxide and the carbon monoxide or the hydrocarbon.

Figure 2:
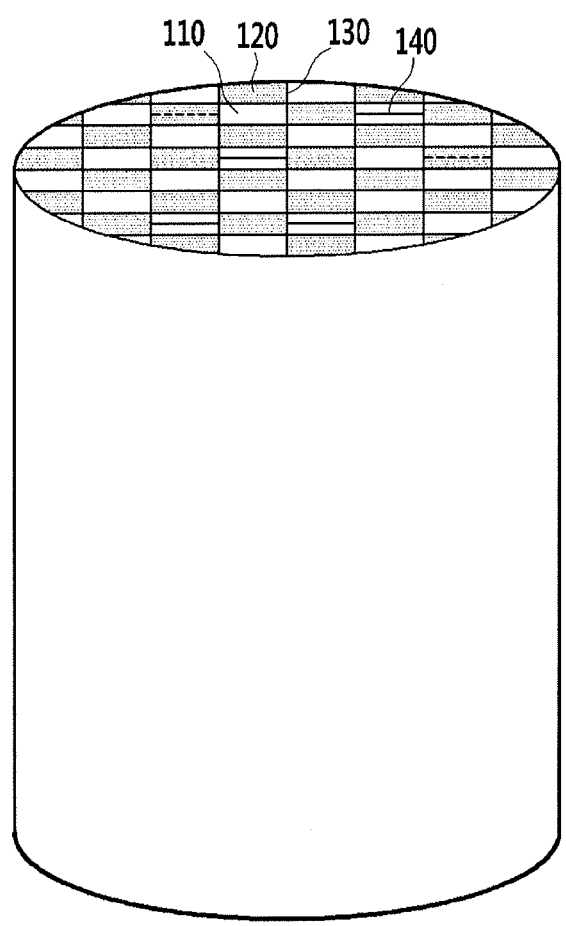
FIG. 2 is a perspective view of a catalyzed particulate filter used in an apparatus of purifying an exhaust gas according to various embodiments of the present invention.
Figure 3:
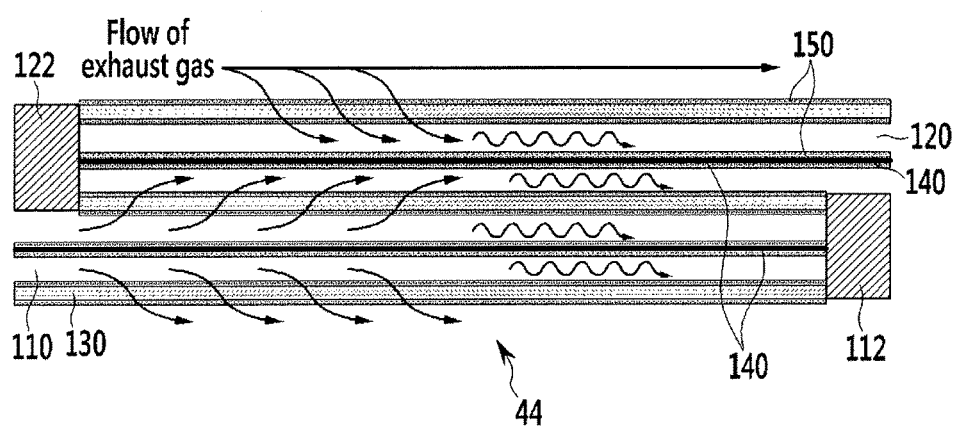
FIG. 3 is a cross-sectional view of the catalyzed particulate filter according to various embodiments of the present invention.
Figure 4:
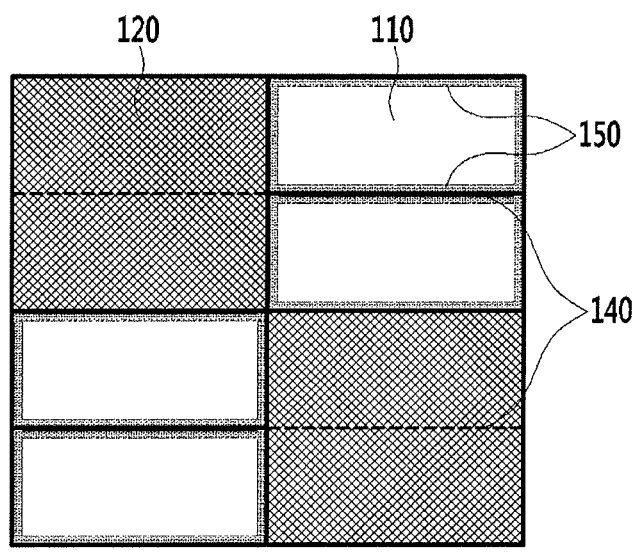
FIG. 4 is a front view illustrating some of inlet and outlet channels in the catalyzed particulate filter according to various embodiments of the present invention.

The CPF 44 is located within the catalytic converter 40 downstream of the LNT device 42. A distance between an outlet of the LNT device 42 and an inlet of the CPF 44 is set to a predetermined distance. The predetermined distance may be smaller than or equal to 600 mm. Preferably, the predetermined distance is larger than or equal to 100 mm. If the predetermined distance is larger than 600 mm, a temperature of the CPF 44 is too low to secure a regeneration temperature or a desulfurization temperature. On the contrary, if the predetermined distance is smaller than 100 mm, the CPF cannot purify and can exhaust the nitrogen oxide due to high temperature of the CPF 44 at high speed condition or high load condition. With reference to FIG. 2 to FIG. 4, the CPF 44 will be described in detail.

FIG. 2 is a perspective view of a catalyzed particulate filter used in an apparatus of purifying an exhaust gas according to various embodiments of the present invention, FIG. 3 is a cross-sectional view of the catalyzed particulate filter according to various embodiments of the present invention, and FIG. 4 is a front view illustrating some of inlet and outlet channels in the catalyzed particulate filter according to various embodiments of the present invention.

As shown in FIG. 2, the CPF 44 according to various embodiments of the present invention includes at least one inlet channel 110 and at least one outlet channel 120 within a housing. The at least one inlet channel 110 and the at least one outlet channel 120 are separated from each other by walls 130. In addition, supports 140 may be located within at least one among the at least one inlet channel 110 and the at least one outlet channel 120.

In this specification, the inlet channel 110 and the outlet channel 120 may be collectively referred to as 'cells.'

Although, in this specification, the housing has a cylindrical shape and the cells have a rectangular shape, the housing and the cells are not limited to such shapes. In addition, the housing may be a housing of the catalytic converter, but is not limited thereto.

Referring to FIG. 3 and FIG. 4, the inlet channel 110 extends along a flow of the exhaust gas. A front end of the inlet channel 110 is open so that the exhaust gas is introduced into the CPF 44 through the inlet channel 110. A rear end of the inlet channel 110 is blocked by a first plug 112. Therefore, the exhaust gas in the CPF 44 cannot flow out of the CPF 44 through the inlet channel 110.

The outlet channel 120 extends along the flow of the exhaust gas and may be placed parallel to the inlet channel 110. At least one inlet channel 110 is located around the outlet channel 120.

For example, if the cells have a rectangular shape, each outlet channel 120 is surrounded by walls 130 on four sides. At least one of the four sides is located between each outlet channel 120 and a neighboring inlet channel 110. If the cells have a rectangular shape, each outlet channel 120 may be surrounded by four neighboring inlet channels 110 and each inlet channel 110 may be surrounded by four neighboring outlet channels 120, but various embodiments of the present invention are not limited thereto.

Since a front end of the outlet channel 120 is blocked by a second plug 122, the exhaust gas cannot flow into the CPF 44 through the outlet channel 120. A rear end of the outlet channel 120 is open so that the exhaust gas in the CPF 44 flows out of the CPF 44 through the outlet channel 120.

A wall 130 is placed between neighboring inlet and outlet channels 110 and 120 to define the boundary between them. The wall 130 may be a porous wall 130 with at least one micropore in it. The porous wall 130 allows the neighboring inlet and outlet channels 110 and 120 to fluidly communicate with each other. Thus, the exhaust gas introduced into the inlet channel 110 may move to the outlet channel 120 through the porous wall 130. Moreover, the porous wall 130 prevents particulate matter in the exhaust gas from passing therethrough. When the exhaust gas moves from the inlet channel 110 to the outlet channel 120 through the porous wall 130, the particulate matter in the exhaust gas is filtered through the porous wall 130. The porous wall 130 may be made from aluminum titanate, codierite, silicon carbide, etc.

The support 140 may be located within at least one among the at least one inlet channel 110 and the at least one outlet channel 120. The support 140 may be located only within the at least one inlet channel 110 or only within the at least one outlet channel 120. Although FIGS. 2 through 4 illustrate that the support 140 extends parallel to the direction in which the inlet channel 110 and/or the outlet channel 120 extend, the various embodiments of present invention are not limited thereto. That is, the support 140 may extend perpendicular or obliquely to the direction in which the inlet channel 110 and/or the outlet channel 120 extend. In the case that the support 140 extends perpendicular or obliquely to the direction in which the inlet channel 110 and/or the outlet channel 120 extend, at least one of the two ends of the support 140 may not come into contact with the porous wall 130 that separates the cells from one another. In the case that the support 140 extends parallel to the direction in which the inlet channel 110 and/or the outlet channel 120 extend, the support 140 may extend over the entire length of the channel 110 or 120 or extend over part of the length of the channel 110 or 120.

In the CPF 44 according to various embodiments of the present invention, the support 140 is located within the at least one inlet channel 110 and within the at least one outlet channel 120. In addition, the same type of the catalyst 150 is coated on of the porous wall 130 and the support 140. That is, both of a catalyst coated on the porous wall 130 and a catalyst coated on the support 140 are a second LNT catalyst 150.

The second LNT catalyst 150 coated on the porous wall 130 and the support 140 includes ceria ($CeO_2$), barium (Ba), and a noble metal including platinum (Pt). The second LNT catalyst 150 coated on the porous wall 130 and the support 140 and the first LNT catalyst coated in the LNT device 42 have the same ingredients. However, content (wt %) of each ingredient of the second LNT catalyst 150 is different from that of the first LNT catalyst coated in the LNT device 42.

In various embodiments (e.g., a vehicle with low or middle displacement volume), the content of the ceria in the second LNT catalyst 150 coated on the porous wall 130 and the support 140 is at least 10% higher than that in the first LNT catalyst coated in the LNT device 42, and the content of the platinum in the second LNT catalyst 150 coated on the porous wall 130 and the support 140 is 10%-50% higher than that in the first LNT catalyst coated in the LNT device 42. The second LNT catalyst 150 coated on the porous wall 130 and the support 140 is regenerated (it means the LNT, catalyst releases and reduces the nitrogen oxide at the rich air/fuel ratio) and desulfurized at a relatively low temperature. Therefore, the ceria content in the second LNT catalyst 150 coated on the porous wall 130 and the support 140 is increased so that generation of heat is increased at the rich air/fuel ratio, and the platinum content in the second LNT catalyst 150 coated on the porous wall 130 and the support 140 is increased so that generation of heat is increased and reaction of the nitrogen oxide with the carbon monoxide or the hydrocarbon is promoted.

In various embodiments (a vehicle with high displacement volume), the content of the ceria in the second LNT catalyst 150 coated on the porous wall 130 and the support 140 is at least 10% lower than that in the first LNT catalyst coated in the LNT device 42, and the content of the barium in the second LNT catalyst 150 coated on the porous wall 130 and the support 140 is at least 10% higher than that in the first LNT catalyst coated in the LNT device 42. Thereby, the CPF 44 is suitable for absorbing and reducing the nitrogen oxide at a relatively high temperature of 300° C.-450° C.

Meanwhile, the support 140 is provided to hold the second LNT catalyst 150 in place, rather than serving as a filter. Thus, the support 140 is not necessarily made from a porous material. That is, the support 140 may be made from the same material as the porous wall 130 or a different material. Even in the case that the support 140 is made from a porous material, the exhaust gas mostly moves along the support 140 and the wall 130 without passing through the support 140, because there is little difference in pressure between the two parts of the channel 110 or 120 separated by the support 140. Also, the support 140 does not need to be thick since it is not required to serve as a filter. That is, the support 140 may be thinner than the wall 130, which minimizes an increase in back pressure.

Figure 5:
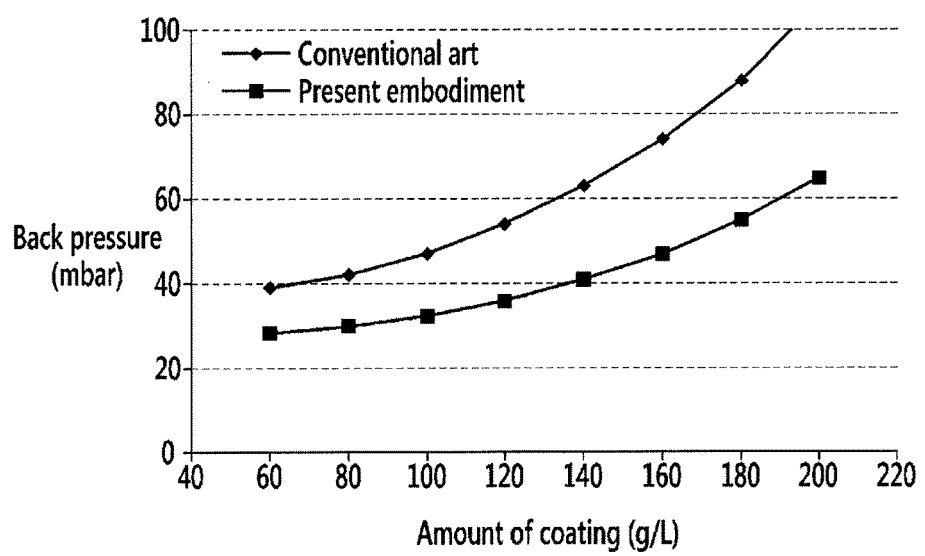
FIG. 5 is a graph illustrating back pressure vs. the amount of catalyst.

FIG. 5 is a graph illustrating back pressure vs. the amount of catalyst.

As shown in FIG. 5, in order to reduce the back pressure, it is difficult to coat the catalyst greater than or equal to 120 g/L in the CPF according to conventional arts, but the catalyst of 180 g/L can be coated in the CPF 44 according to various embodiments. That is, since various embodiments can minimizes increase in the back pressure and increase the amount of the catalyst 150 coated in the CPF 44, purifying performance of the exhaust gas may be improved.

As described above, since the CPF 44 includes the second LNT catalyst 150, the CPF 44 can absorb the NOx contained in the exhaust gas at a lean air/fuel ratio, release the absorbed NOx at a rich air/fuel ratio, and reduce the nitrogen oxide contained in the exhaust gas or the released NOx or to generate ammonia ($NH_3$). In addition, the CPF 44 oxidizes the carbon monoxide (CO) and the hydrocarbon (HC) contained in the exhaust gas and traps the particulate matter in the exhaust gas.

Referring to FIG. 1 again, the SCR device 50 is mounted on the exhaust pipe 20 downstream of the catalytic converter 40. The SCR device 50 includes an SCR catalyst coated therein so as to further reduce the nitrogen oxide if the nitrogen oxide is slipped from the catalytic converter 40. That is, the SCR device 50 reduces the nitrogen oxide in the exhaust gas by using the ammonia generated in the catalytic converter 40. The SCR device 50 may be mounted physically apart from the catalytic converter 40.

Meanwhile, various sensors may be mounted on the exhaust pipe 20 of the apparatus of purifying an exhaust gas according to various embodiments of the present invention.

In more detail, a first lambda sensor 62 and a first temperature sensor 64 are mounted on the exhaust pipe 20 upstream of the catalytic converter 40.

The first lambda sensor 62 detects a lambda of the exhaust gas flowing into the catalytic converter 40 (i.e., LNT device 42) (hereinafter, it will be called an 'inlet lambda of the LNT device') and transmits a signal corresponding thereto to the controller 60.

The first temperature sensor 64 detects a temperature of the exhaust gas flowing into the catalytic converter 40 (i.e., LNT device 42) and transmits a signal corresponding thereto to the controller 60.

In addition, a second lambda sensor 66 and a second temperature sensor 68 are mounted on the exhaust pipe 20 downstream of the LNT device 42.

The second lambda sensor 66 detects a lambda of the exhaust gas flowing out the LNT device 42 (hereinafter, it will be called an 'outlet lambda of the LNT device'.) and transmits a signal corresponding thereto to the controller 60. On the basis of the values detected by the first lambda sensor 62 and the second lambda sensor 66, the controller 60 may perform regeneration of the LNT device 42.

The second temperature sensor 68 detects a temperature of the exhaust gas flowing out the LNT device 42 and transmits a signal corresponding thereto to the controller 60. On the basis of the values detected by the first temperature sensor 64 and the second temperature sensor 68, the controller 60 may calculate a temperature of the LNT device 42. For example, the temperature of the LNT device 42 may be an average of the values detected by the first temperature sensor 64 and the second temperature sensor 68.

A pressure difference sensor 70 is mounted between an inlet portion and an outlet portion of the CPF 44, and a third lambda sensor 72 is mounted on the exhaust pipe 20 downstream of the catalytic converter 40.

The pressure difference sensor 70 detects pressure difference between the inlet portion and the outlet portion of the CPF 44 and transmits a signal corresponding thereto to the controller 60. The controller 60 may control the CPF 44 to burn the particulate matter if the pressure difference detected by the pressure difference sensor 66 is larger than or equal to a predetermined pressure. In this case, the particulate matter trapped in the CPF 44 may be burnt by post-injecting the fuel through the injector 14.

The third lambda sensor 72 detects a lambda of the exhaust gas flowing out the CPF 44 (hereinafter, it will be called an 'outlet lambda of the CPF') and transmits a signal corresponding thereto to the controller 60. The controller 60 may perform regeneration of the LNT device 42 and the CPF 44 on the basis of the values detected by the first lambda sensor 62 and the third lambda sensor 72, and may perform regeneration of the CPF 44 on the basis of the values detected by the second lambda sensor 66 and the third lambda sensor 72.

The controller 60 determines regeneration timings of the LNT device 42 and the CPF 44 based on the signals from the sensors and executes lean/rich control based on the regeneration timings of the LNT device 42 and the CPF 44. For example, the controller 60 controls the air/fuel ratio to be rich such that the nitrogen oxide is removed from the LNT device 42 and/or the CPF 44 (it will be called 'regeneration' in this specification). The lean/rich control may be performed by controlling an amount of the fuel injected by the injector 14 and an injection timing.

Meanwhile, the controller 60 includes a plurality of maps and a plurality of models defining characteristics of the LNT device 42 and the CPF 44, and calculates NOx amount absorbed in the LNT device 42, NOx amount absorbed in the CPF 44, temperature of the LNT device 42 and/or temperature of the CPF 44 based on the plurality of maps and the plurality of models. In addition, the controller 60 may calculate $NH_3$ amount generated in the LNT device 42 and the CPF 44. The plurality of maps and models may be produced through a lot of experiments.

In addition, the controller 60 performs the regeneration of the LNT device 42 and the CPF 44.

For these purposes, the controller 60 may be realized by at least one processor executing a predetermined program, and the predetermined program is programmed to perform each step of a regeneration method of an apparatus of purifying an exhaust gas according to various embodiments of the present invention.

Hereinafter, operation of the apparatus of purifying an exhaust gas according to various embodiments of the present invention will be described.

The nitrogen oxide in the exhaust gas is mainly absorbed in the LNT device 42 at a normal driving condition (a condition where a temperature of the exhaust gas is not excessively high). If the vehicle runs at high speed or high load condition, the LNT device 42 can hardly absorb the nitrogen oxide due to a high temperature of the exhaust gas. At this time, since the CPF 44 is disposed at a downstream of and apart from the LNT device 42, a temperature of the CPF 44 is lower than that of the LNT device 42. Therefore, the CPF 44 can mainly absorb the nitrogen oxide in the exhaust gas at the high temperature or the high load condition. In addition, heat capacity of the CPF 44 is large and thus temperature change of the CPF 44 is small. Therefore, thermal release of the nitrogen oxide from the CPF 44 decreases at the high temperature or the high load condition. Further, because most of the CO/HC which reacts competitively against the nitrogen oxide is removed at the LNT device 42, absorption efficiency of the nitrogen oxide may be enhanced.

Since the SCR device 50 is mounted on the exhaust pipe 20 downstream of the catalytic converter 40, the nitrogen oxide in the exhaust gas can be finally removed by using the ammonia generated at the catalytic converter 40.

A system for executing a regeneration method of an apparatus of purifying an exhaust gas according to various embodiments of the present invention will hereinafter be described.

Figure 6:
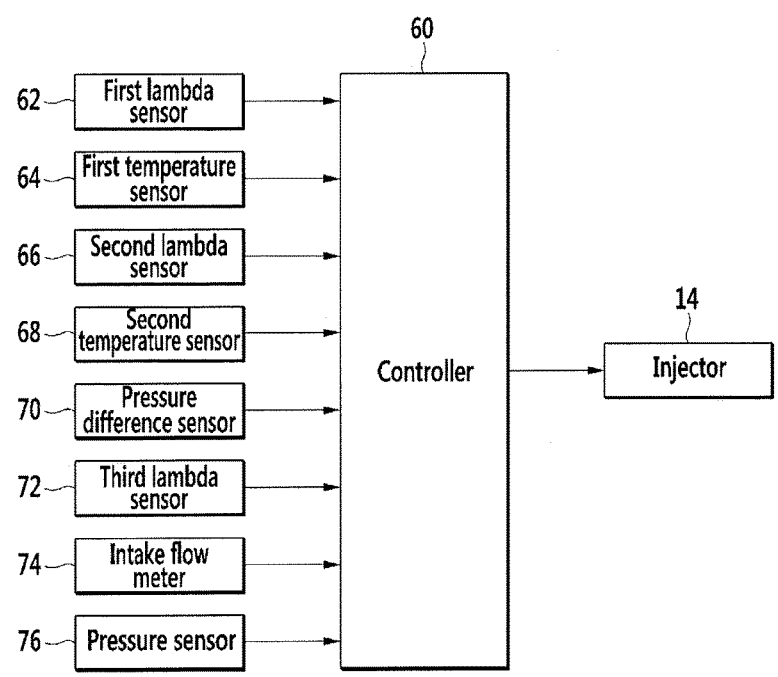
FIG. 6 is a block diagram of a system for executing a regeneration method of an apparatus of purifying an exhaust gas according to various embodiments of the present invention.

FIG. 6 is a block diagram of a system for executing a regeneration method of an apparatus of purifying an exhaust gas according to various embodiments of the present invention.

As shown in FIG. 6, the first lambda sensor 62, the first temperature sensor 64, the second lambda sensor 66, the second temperature sensor 68, the pressure difference sensor 70, the third lambda sensor 72, an intake flow meter 74, and a pressure sensor 76 are electrically connected to and transmit the detected values to the controller 60.

The first lambda sensor 62 detects the inlet lambda of the LNT device 42 and transmits the signal corresponding thereto to the controller 60. Typically, a lambda is a ratio of an actual air/fuel ratio to a stoichiometry air/fuel ratio. If a lambda is greater than 1, the air/fuel ratio is lean atmosphere. On the contrary, if a lambda is less than 1, the air/fuel ratio is rich atmosphere.

The first temperature sensor 64 detects the temperature of the exhaust gas flowing into the catalytic converter 40 and transmits the signal corresponding thereto to the controller 60.

The second lambda sensor 66 detects the outlet lambda of the LNT device 42 and transmits the signal corresponding thereto to the controller 60.

The second temperature sensor 68 detects the temperature of the exhaust gas flowing out the LNT device 42 and transmits the signal corresponding thereto to the controller 60.

The pressure difference sensor 70 detects the pressure difference between the inlet portion and the outlet portion of the CPF 44 and transmits the signal corresponding thereto to the controller 60. If the pressure difference detected by the pressure difference sensor 66 is larger than or equal to the predetermined pressure, the controller 60 controls to burn the particulate matter trapped in the CPF 44.

The third lambda sensor 72 detects the outlet lambda of the CPF 44 and transmits the signal corresponding thereto to the controller 60.

The intake flow meter 74 detects an intake amount supplied to an intake system of the engine 10 and transmits a signal corresponding thereto to the controller 60.

The pressure sensor 76 detects combustion pressure in the engine 10 and transmits a signal corresponding thereto to the controller 60.

The controller 60 calculates the temperature of the LNT device 42 and the temperature of the CPF 44 based on the detected values. In addition, the controller 60 calculates a NOx amount generated in the engine 10 based on the intake amount and the combustion pressure, calculates the NOx amount absorbed in the LNT device 42 based on the NOx amount generated in the engine 10 and the temperature of the LNT device 42, and calculates the NOx amount absorbed in the CPF 44 based on the NOx amount generated in the engine 10, the NOx amount absorbed in the LNT device 42, and the temperature of the CPF 44. In addition, the controller 60 determines the regeneration timings of the LNT device 42 and the CPF 44 based on the NOx amount absorbed in the LNT device 42, the NOx amount absorbed in the CPF 44, the temperature of the LNT 42, and the temperature of the CPF 44, and outputs a signal for controlling the injector 14 to the injector 14.

Meanwhile, a plurality of sensors other than the sensors illustrated in FIG. 6 may be mounted in the apparatus according to various embodiments of the present invention, but for better comprehension and ease of description, description thereof will be omitted.

A regeneration method of an apparatus of purifying an exhaust gas according to various embodiments of the present invention will hereinafter be described in detail.

FIG. 7 is a flowchart of a regeneration method of an apparatus of purifying an exhaust gas according to various embodiments of the present invention.

As shown in FIG. 7, the controller 60 determines the temperature of the LNT device 42 at step S200. The temperature of the LNT device 42 may be an average of the values detected by the first temperature sensor 64 and the second temperature sensor 68, but is not limited thereto.

The controller 60 determines the temperature of the CPF 44 at step S210. The controller 60 may determine the temperature of the CPF 44 from a predetermined model based on the detected value of the second temperature sensor 68, but the determination of the temperature of the CPF 44 is not limited thereto.

After that, the controller 60 calculates the NOx amount absorbed in the LNT device 42 at step 220. The controller 60 inputs the intake amount and the combustion pressure into a predetermined model so as to calculate the NOx amount generated in the engine 10, and inputs the NOx amount generated in the engine 10 and the temperature of the LNT 42 into a predetermined model so as to calculate the NOx amount absorbed in the LNT device 42. However, the calculation of the NOx amount generated in the engine 10 and the NOx amount absorbed in the LNT device 42 is not limited to these.

After that, the controller 60 calculates the NOx amount absorbed in the CPF 44. The controller 60 inputs the NOx amount generated in the engine 10, the NOx amount absorbed in the LNT device 42, and the temperature of the CPF 44 into a predetermined model so as to calculate the NOx amount absorbed in the CPF 44. However, the calculation of the NOx amount absorbed in the CPF 44 is not limited to this.

After that, the controller 60 determines whether the NOx amount absorbed in the LNT device 42 is greater than a threshold NOx amount at step S240. Herein, the threshold NOx amount may be predetermined according to a volume of the LNT device 42, aging of the LNT device 42, etc.

If the NOx amount absorbed in the LNT device 42 is smaller than or equal to the threshold NOx amount at the step S240, the regeneration method returns to the step S200 and the controller 60 determines the temperature of the LNT device 42.

If the NOx amount absorbed in the LNT device 42 is greater than the threshold NOx amount at the step S240, the controller 60 determines whether the temperature of the LNT device 42 is higher than a first predetermined temperature at step S250. Herein, the first predetermined temperature is a temperature at which the LNT device 42 can be regenerated actively and may be predetermined by a person of an ordinary skill in the art. For example, the first predetermined temperature may be 280° C., but is not limited to this.

If the temperature of the LNT device 42 is higher than the first predetermined temperature at the step S250, the controller 60 determines whether the temperature of the CPF 44 is higher than a second predetermined temperature at step S260. Herein, the second predetermined temperature is a temperature at which the CPF 44 can be regenerated actively and may be predetermined by a person of an ordinary skill in the art. For example, the second predetermined temperature may be 280° C., but is not limited to this. In addition, the second predetermined temperature is lower than or equal to the first predetermined temperature.

If the temperature of the CPF 44 is higher than the second predetermined temperature at the step S260, the controller 60 regenerates the LNT device 42 and the CPF 44 simultaneously at step S280. That is, the controller 60 controls the injector 14 to cause the air/fuel ratio to be rich until a difference between the detected value of the first lambda sensor 62 (or the inlet lambda of the LNT device 42) and the detected value of the third lambda sensor 72 (or the outlet lambda of the CPF 44) is smaller than or equal to a predetermined value. In this case, the NOx which was absorbed in the LNT device 42 and the CPF 44 is released and is reduced by reductant contained in the exhaust gas.

If the temperature of the CPF 44 is lower than or equal to the second predetermined temperature at the step S260, the controller 60 regenerates the LNT device 42 at step S290. That is, the controller 60 controls the injector 14 to cause the air/fuel ratio to be rich until a difference between the detected value of the first lambda sensor 62 (or the inlet lambda of the LNT device 42) and the detected value of the second lambda sensor 66 (or the outlet lambda of the LNT device 42) is smaller than or equal to a predetermined value. In this case, the NOx that was absorbed in the LNT device 42 is released and is reduced by the reductant contained in the exhaust gas. In addition, a portion of the NOx that was absorbed in the CPF 44 is released and is reduced by the reductant contained in the exhaust gas.

If the temperature of the LNT device 42 is lower than or equal to the first predetermined temperature at the step S250, the controller 60 determines whether the temperature of the CPF 44 is higher than the second predetermined temperature at step S270.

If the temperature of the CPF 44 is higher than the second predetermined temperature at the step S270, the controller 60 regenerates the CPF 44 at step S300. That is, the controller 60 controls the injector 14 to cause the air/fuel ratio to be rich until a difference between the detected value of the second lambda sensor 66 (or the outlet lambda of the LNT device 42) and the detected value of the third lambda sensor 72 (or the outlet lambda of the CPF 44) is smaller than or equal to a predetermined value. In this case, the NOx that was absorbed in the CPF 44 is released and the reduced by the reductant contained in the exhaust gas. In addition, a portion of the NOx that was absorbed in the LNT device 42 is released and the reduced by the reductant contained in the exhaust gas. In this case, the controller 60 calculates a NOx amount released from the LNT device 42 through a predetermined model and calculates the NOx amount absorbed in the LNT device 42 again.

If the temperature of the CPF 44 is lower than or equal to the second predetermined temperature at the step S270, the controller 60 does not regenerate the LNT device 42 and the CPF 44 at step S310 and the regeneration method returns to the step S200.

Meanwhile, if necessary, the controller 60 does not stop the regeneration and maintains the rich air/fuel ratio further for a predetermined time even though a difference between any two of the detected values of the first, second, third lambda sensors 62, 66, and 72 is smaller than or equal to the predetermined value. In this case, the NH$_3$ is generated in the LNT device 42 and the CPF 44 and is used to reduce the NOx in the SCR device 50.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for purifying an exhaust gas, comprising:
a catalytic converter disposed on an exhaust pipe and including a lean NOx trap (LNT) device in which a first LNT catalyst is coated and a catalyzed particulate filter (CPF) in which a second LNT catalyst is coated, the LNT device and the CPF being sequentially disposed in the catalytic converter; and
a controller determining or detecting an inlet lambda of the LNT device, an outlet lambda of the LNT device, and an outlet lambda of the CPF, determining or detecting a temperature of the LNT device and a temperature of the CPF, determining nitrogen oxide (NOx) amounts absorbed in the LNT device and the CPF, and controlling regeneration of the LNT device and the CPF,
wherein the controller performs the regeneration of the LNT device and the CPF according to the temperature of the LNT device and the temperature of the CPF when the NOx amount absorbed in the LNT device is greater than a threshold NOx amount, and
the controller performs regeneration of both of the LNT device and the CPF when the temperature of the LNT device is higher than a first predetermined temperature and the temperature of the CPF is higher than a second predetermined temperature.

2. The apparatus of claim 1, wherein the controller performs the regeneration of both of the LNT device and the CPF based on the inlet lambda of the LNT device and the outlet lambda of the CPF.

3. The apparatus of claim 1, wherein the controller performs regeneration of the LNT device when the temperature of the LNT device is higher than the first predetermined temperature and the temperature of the CPF is lower than or equal to the second predetermined temperature.

4. The apparatus of claim 3, wherein the controller performs the regeneration of the LNT device based on the inlet lambda of the LNT device and the outlet lambda of the LNT device.

5. The apparatus of claim 1, wherein the controller performs regeneration of the CPF when the temperature of the LNT device is lower than or equal to the first predetermined temperature and the temperature of the CPF is higher than the second predetermined temperature.

6. The apparatus of claim 5, wherein the controller performs the regeneration of the CPF based on the outlet lambda of the LNT device and the outlet lambda of the CPF.

7. The apparatus of claim 1, wherein the CPF comprises:
at least one inlet channel extending in a longitudinal direction, and having a first end into which fluid flows and a second end which is blocked;

at least one outlet channel extending in the longitudinal direction thereof, and having a first end which is blocked and a second end through which the fluid flows out;
at least one porous wall defining a boundary between neighboring inlet and outlet channels and extending in the longitudinal direction thereof; and
a support with the second LNT catalyst coating thereon, wherein the support is disposed within at least one among the at least one inlet channel and the at least one outlet channel.

8. The apparatus of claim 7, wherein the second LNT catalyst is coated on the porous wall.

\* \* \* \* \*